US012721342B2

(12) United States Patent
Fukami et al.

(10) Patent No.: US 12,721,342 B2
(45) Date of Patent: Sep. 1, 2026

(54) AGRICULTURAL COMPOSITION OF INDOLEACETIC ACID HAVING INCREASED PHOTOSTABILITY, PROCESS FOR THE PRODUCTION AND USE THEREOF

(71) Applicant: TOTAL BIOTECNOLOGIA INDÚSTRIA E COMÉRCIO S/A, Curitiba (BR)

(72) Inventors: Josiane Fukami, Curitiba (BR); Douglas Fabiano Gomes, Curitiba (BR); Juliana Marcolina Gomes, Curitiba (BR); Jonas Hipolito De Assis Filho, Curitiba (BR)

(73) Assignee: TOTAL BIOTECNOLOGIA INDÚSTRIA E COMÉRCIO S/A, Curitiba (BR)

( * ) Notice: Subject to any disclaimer, the term of this patent is extended or adjusted under 35 U.S.C. 154(b) by 219 days.

(21) Appl. No.: 18/014,423

(22) PCT Filed: Apr. 9, 2021

(86) PCT No.: PCT/BR2021/050145
§ 371 (c)(1),
(2) Date: Jan. 4, 2023

(87) PCT Pub. No.: WO2022/213163
PCT Pub. Date: Oct. 13, 2022

(65) Prior Publication Data

US 2023/0255204 A1 Aug. 17, 2023

(51) Int. Cl.
*A01N 43/38* (2006.01)
*A01N 63/20* (2020.01)
*A01P 21/00* (2006.01)

(52) U.S. Cl.
CPC ............. *A01N 43/38* (2013.01); *A01N 63/20* (2020.01); *A01P 21/00* (2021.08)

(58) Field of Classification Search
CPC ......... A01N 43/38; A01N 63/20; A01P 21/00; C07D 207/34; C07D 209/18
See application file for complete search history.

(56) References Cited

FOREIGN PATENT DOCUMENTS

| | | | |
|---|---|---|---|
| GB | 2520147 | A | 5/2015 |
| WO | 00/34440 | A1 | 6/2000 |
| WO | 2014/111932 | A1 | 7/2014 |
| WO | 2020/261273 | A1 | 12/2020 |

OTHER PUBLICATIONS

"Formulate"—Definition by Merriam-Webster online Dictionary, obtained https://www.merriam-webster.com/dictionary/formulate; Accessed Dec. 10, 2025; (total pp. 1-6). (Year: 2025).*

Leasure C.D. et al, "Enhancement of Indole-3-Acetic Acid Photodegradation by Vitamin B6", Molecular Plant (Nov. 2013), vol. 6, No. 6, pp. 1992-1995. (Year: 2013).*

Kim N.H. et al., "Preparation of melanoidin/TiO2 composites with improved UV screening ability and suppressed photocatalytic activity for cosmetic application", Journal of Industrial and Engineering Chemistry, Mar. 8, 2020, vol. 86, pp. 186-193. (Year: 2020).*

Flasinski M et al., "Natural vs synthetic auxin: Studies on the interactions between plant hormones and biological membrane lipids", Environmental Research, 2014, vol. 133, pp. 123-134. (Year: 2014).*

CN104975052A—"Azospirillum brasilense R fermentation medium capable of realizing high yield of ammonia and indoleacetic acid and application of azospirillum brasilense R fermentation medium", an English machine translation, total pp. 1-7. (Year: 2015).*

Santos M.S. et al., "Compatibility of Azospirillum brasilense with Pesticides Used for Treatment of Maize Seeds", International Journal of Microbiology, vol. Jul. 2020, Article ID 8833879, 8 pages (https://doi.org/10.1155/2020/8833879). (Year: 2020).*

Written Opinion for PCT/BR2021/050145, dated Dec. 2, 2021.

International Search Report for PCT/BR2021/050145, dated Dec. 2, 2021.

* cited by examiner

*Primary Examiner* — Satyendra K Singh
(74) *Attorney, Agent, or Firm* — Sughrue Mion, PLLC

(57) ABSTRACT

The present invention relates to the process for the production of an agricultural composition comprising the photostabilization of indoleacetic add (IAA) of biological and/or synthetic origin in a mixture comprising said IAA and sources of nitrogen and reducing sugars. Photostabilization of IAA phytohormone for application in crops of agricultural interest according to the present invention is achieved by applying high temperatures to said mixture in order to cause conversion of said sources of nitrogen and reducing sugars into melanoidin type pigments via a Maillard reaction to reduce IAA photodegradation.

20 Claims, No Drawings

AGRICULTURAL COMPOSITION OF INDOLEACETIC ACID HAVING INCREASED PHOTOSTABILITY, PROCESS FOR THE PRODUCTION AND USE THEREOF

CROSS REFERENCE TO RELATED APPLICATIONS

This application is a National Stage of International Application No. PCT/BR2021/050145 filed Apr. 9, 2021.

TECHNICAL FIELD OF THE INVENTION

The present invention relates to agricultural compositions for promoting plant growth, which comprise indoleacetic acid (IAA) of biological and/or synthetic origin having increased photostability, as well as the process for the manufacture and use thereof.

BACKGROUND OF THE INVENTION

Production of plant hormones by bacteria is one of the main factors responsible for promoting plant growth. Phytohormones (auxins, cytokinins, gibberellins, ethylene and abscisic acid) are organic substances that play roles in regulating plant growth (Raven et al., 2001). The main naturally occurring auxin is indoleacetic acid (IAA), which has great potential for use as a plant growth regulator. Several microorganisms, such as bacteria and fungi in the soil and/or associated with plants synthesize growth hormones identical to those found in plants, including indoleacetic acid (IAA). The use of agricultural compositions comprising plant hormones, such as IAA, is therefore desirable for promoting the growth of crop plants.

In plants, microbial IAA produced by bacteria from the genus *Azospirillum* spp., *Alcaligenes faecalis, Klebsiella* sp., *Enterobacter* sp., *Xanthomonas* sp., *Pseudomonas* spp., *Bacillus* spp., *Herbaspirillum seropedicae, Rhizobium* spp. and *Bradyrhizobium* spp. has been linked to plant growth stimulation (Patten and Glick, 1996; Idris et al., 2007; Kochar et al., 2011; Shao et al., 2015).

A microorganism is believed to be able to select a particular route for the biosynthesis of IAA from among the several available depending on the environment. It is also reported that there is more than one route for IAA synthesis in many bacteria, most of them being the tryptophan-dependent pathway (Patten and Glick, 1996). Induction of IAA biosynthesis through tryptophan-dependent pathways is well known and studied (Tullio et al., 2019; Iamada et al., 2017). Production of indoleacetic acid through fermentation of *Azospirillum* is described, for example, in CN 104 975 052. Although the IAA molecule is relatively highly stable to physical factors such as temperature and pH of the culture medium (Hiratsuka et al., 1989), photodegradation of the phytohormone is one of the major obstacles concerning the use of IAA-containing agricultural compositions (Dunlap and Robacker, 1988; Stasinopoulos and Hangarter, 1990 and Hiratsuka et al., 1989). Light decomposition reduces up to 90% of the synthesized IAA depending on the wavelength and intensity.

Therefore, there remains a need in the art for agricultural compositions containing IAA phytohormone having increased photostability, so that the compound can remain stable and active for longer periods of time after application of the composition to a plant crop on a commercial scale.

DESCRIPTION OF THE PRESENT INVENTION

Surprisingly, the present invention teaches that it is possible to achieve a composition comprising indoleacetic acid (IAA) for agricultural application having increased photostability by combining IAA with melanoidin type pigments in said composition. The IAA used in the compositions and methods of the present invention can be of biological and/or synthetic origin.

As will be shown in the present document, stabilization by combining pigments of the melanoidin type and IAA provides photoprotection to IAA from biological and/or synthetic sources.

In one embodiment, the present invention provides a composition comprising a combination of IAA with melanoidin-type pigments. A composition of the present invention may optionally contain additives, or agriculturally acceptable carriers, such as additives for treating seeds and sowing furrows, cell protectors for spray tanks, soil conditioners, grout adjuvants, polymers for seed coatings, polymers for coating granules of chemical or organic fertilizers, solid fertilizers, liquid fertilizers used in formulations for foliar products, endospore activators, among other purposes.

A composition according to the present invention can be packaged in a suitable packaging known in the art. Preferably a bag and/or plastic bottles can be used without the need for oxygen exchange of the final product. Packaging of the product of the present invention eliminates the need for light protection, as it is photostable. Preferably, the packaged volume can contain approximately 1 to 20 L and can be stored in refrigerated environments or at room temperature in the range of approximately 10 to 35° C.

The present invention further provides methods of preparing an IAA agricultural composition having increased photostability by combining IAA with melanoidins. In a specific embodiment of the present invention, the combination of IAA with melanoidin-type pigments is performed by subjecting a mixture comprising IAA and nitrogen sources and reducing sugars to temperature and pressure conditions that promote the conversion of nitrogen sources and reducing sugars into melanoidin-type pigments through the Maillard reaction. In an alternative embodiment, IAA and melanoidin-type pigments are combined after formation of said pigments via Maillard reaction.

The term "nitrogen sources" includes, but is not limited to, amino acids, peptides and proteins of biological or synthetic origin known in the art and mixtures or biological extracts containing the same.

The term "reducing sugars" includes, but is not limited to, any sugar capable of acting as a reducing agent for having a free aldehyde group or a free ketone group known in the art, and mixtures or biological extracts containing the same.

In a preferred embodiment of the present invention, the mixture comprising said IAA and said nitrogen sources and reducing sugars is obtained by fermenting IAA-producing bacteria in a tryptophan-containing culture medium. The broth obtained from said fermentation contains IAA produced by bacteria and nitrogen sources and reducing sugars from the fermented culture medium. After said fermentation, the broth is subjected to temperature and pressure conditions that promote the conversion of the nitrogen sources and reducing sugars into melanoidin-type pigments via the Maillard reaction, so that melanoidin-type pigments confer photoprotection on the IAA of the composition.

The term "IAA-producing bacteria" includes, but is not limited to, bacteria of the genus *Azospirillum* spp., *Alcaligenes faecalis, Klebsiella* sp., *Enterobacter* sp., *Xanthomonas* sp., *Herbaspirillum seropedicae, Rhizobium* spp. and *Bradyrhizobium* spp. (Patten and Glick, 1996). Preferably, the IAA-producing bacteria is *Azospirillum brasilense.*

Therefore, a preferred specific embodiment of the present invention includes a method for industrial production of an agricultural composition comprising the steps of fermenting a culture comprising one or more IAA-producing bacteria strains and tryptophan, for the biosynthesis of indoleacetic acid (IAA); and stabilization under temperature and pressure conditions that promote the conversion of nitrogen sources and reducing sugars into melanoidin-type pigments via the Maillard reaction.

The present invention further provides a composition produced by the method of the present invention, as well as the use thereof.

Advantageously, in a preferred embodiment, the present invention provides an IAA agricultural composition having increased photostability, which is solely obtained by biological pathways, being free of synthetic ingredients.

The present invention further provides preferred embodiments that include additional parameters of the method for the industrial production of an IAA agricultural composition, such as pressure, temperature, oxygenation (air volume and agitation) and culture media parameters for the fermentation of IAA-producing bacteria to produce high IAA concentrations.

As will be understood by the person skilled in the art, different IAA-producing bacteria strains, preferably *Azospirillum brasilense*, can be employed, as well as different culture and fermentation parameters can be combined with the present invention.

In a preferred embodiment, the present invention provides a process for producing an agricultural composition comprising the steps of:

(a) fermenting a culture comprising one or more IAA-producing bacteria strains and tryptophan for the biosynthesis of indoleacetic acid (IAA); and
(b) stabilization under temperature and pressure conditions that promote the conversion of nitrogen sources and reducing sugars into melanoidin-type pigments via the Maillard reaction.

Surprisingly, IAA photostability in a composition according to the present invention is achieved through the combination with melanoidins without which the use of the bioproduct in agriculture would be impossible due to its degradation by light. The pigments described above are capable of filtering the light that falls on the final product, protecting the IAA phytohormone, whether it is biosynthesized through the tryptophan-induced pathway or of synthetic origin.

In a preferred embodiment of the present invention, the melanoidin pigments are from a process known as the Maillard reaction. This reaction has three stages according to the intensity, wherein in the most advanced stage polymerization of amino compounds with sugars fragments into brown pigments, melanoidins takes place (Van Boekel, 1998). In embodiments involving the use of a mixture consisting of a broth obtained by fermenting an IAA-producing bacteria, this reaction takes place after said fermentation by converting the sources of nitrogen and reducing sugars, inserted during the fermentation process into pigments that guarantee IAA stability. It causes the high phytohormone levels in the final product to remain highly stable, even under conditions of light irradiation, inside the package where the product is stored and marketed, or in agricultural application to seeds, planting furrows, irrigation or leaves, in environments under high incidence of UV wavelengths without impairing its agronomic efficiency.

In a specific embodiment, the IAA-producing bacteria is *Azospirillum* sp., more preferably *Azospirillum brasilense*.

In a preferred embodiment, one or more *A. brasilense* strains are selected from the group consisting of Ab-V5, Ab-V6, Sp6, Sp7, Sp245, Cd, 8-I, Az39. In an even more preferred embodiment, both Ab-V5 and Ab-V6 strains are used.

In a preferred embodiment, phytohormone stabilization is carried out in the fermenter environment. Preferably, the stabilization process is carried out for about 15 to 120 minutes at a temperature of about 100° C. to about 130° C. Preferably, product stabilization is carried out at a pressure of about 0.5-2.0 Kgf/cm$^2$.

In a preferred embodiment according to the present invention, batch or fed-batch fermentation of the *A. brasiliense* culture takes place for about 18 to 96 hours.

In a preferred embodiment, the method of the present invention comprises the sequential expansion (up-scaling) of the *A. brasilense* culture for inoculation of the fermentation culture. Preferably, sequential expansion starts at volumes of 100 mL, which serves as an inoculum for about 10 L. These, in turn, are inoculated in about 180 L, which are, then, finally transferred to reactors of about 2,000 L.

In a preferred embodiment, *A. brasilense* strain cultures are expanded in flasks of about 100 mL by incubation on an orbital shaker at about 80 rpm at about 150 rpm. Incubation time is preferably of from about 18 hours to about 96 hours. Preferably, *A. brasilense* strains are then grown in stainless steel round flasks containing about 10 L of culture medium. The incubation time is preferably of about 8 to about 96 hours with an air flow rate of about 0.25 Nm$^3$/h to about 1.0 Nm$^3$/h (=0.41-1.66 vvm).

In a preferred embodiment, the culture temperature for multiplication of the *A. brasilense* strains according to the present invention is about 22° C. to about 38° C.

In a preferred embodiment, *A. brasilense* Ab-V5 and Ab-V6 strains are inoculated together in the up-scaling process from the 180 L of culture described for the present invention. To this end, in a preferred mode, after growing the strains in two stainless steel round flasks of approximately 10 L, said flasks are inoculated into tanks containing about 180 L of culture medium and incubated for about 18 to about 96 hours. The air flow rate is preferably from about 1.25 to about 3.0 Nm$^3$/h (=0.1-0.25 vvm).

In a preferred embodiment, the fermentation step is carried out at a temperature of about 22° C. to about 38° C. The air flow rate is preferably about 1.0 Nm$^3$/h to about 2.5 Nm$^3$/h (=0.0085-0.021 vvm). The pressure is preferably from about 0.5 to about 1.2 kgf/cm$^3$. Stirring is preferably from about 40 hz to about 45 hz. The fermentation step is preferably carried out for about 18 h to about 96 h.

In a preferred embodiment, the culture medium used for up-scaling the *A. brasilense* culture and/or fermentation for the 100 mL scale is NFb medium (Döbereiner, 1995). For other production scales, i.e., 10 L, 180 L and 2,000 L, in a preferred mode, the culture medium described in table 1 is used.

In an alternative embodiment, the present invention provides an IAA agricultural composition having increased photostability and being obtainable by a method according to the present invention as described above.

In an alternative embodiment, the present invention further provides the use of the agricultural composition according to the present invention for application in agricultural crops as a plant growth promoter or biochemical. Preferably the use is for application to seeds, planting furrows, irrigation or foliar application by spraying.

In an alternative embodiment, the present invention provides the use of the photostabilized IAA phytohormone, according to the present invention, for the preparation of an agricultural composition for optimizing the growth of an agricultural crop and/or increasing the yield of an agricultural crop.

In an alternative embodiment, the present invention provides a plant, plant part and/or seed coated with the composition obtained according to the present invention.

EXAMPLES

Example 1—Culture Up Scale

*Azospirillum brasilense* Ab-V5 and Ab-V6 strains are inoculated separately in flasks containing 100 mL of NFb culture medium (Döbereiner, 1995), incubated in an orbital shaker at 80 to 150 rpm, at 22 to 38° C. for approximately 18 to 96 hours. The next up scaling step consists of inoculating stainless steel round flasks containing 10 L of culture medium (Table 1), in which the strains are grown separately and incubated for about 18 to 96 hours, at an air flow rate of 0.25 to 1.0 $Nm^3/h$ (=0.41 to 1.66 vvm) and a temperature of about 22 to 37° C. Thereafter, each culture is inoculated into tanks containing 180 L of culture medium and incubated for approximately 18 to 96 hours, at an air flow rate of 0.25 to 3.0 $Nm^3/h$ (=0.1 to 0.25 vvm) and a temperature ranging from 22 to 38° C.

TABLE 1

Culture medium used for growing *Azospirillum brasilense* Ab-V5 and Ab-V6 strains

| | Reagents | 1 L |
|---|---|---|
| 01 | Dibasic potassium phosphate | 2 to 8 g |
| 02 | Monobasic potassium phosphate | 2 to 6 g |
| 03 | Calcium chloride | 0.01 to 0.03 g |
| 04 | Magnesium sulfate | 0.1 to 0.3 g |
| 05 | Sodium Chloride | 0.1 to 0.2 g |
| 06 | Ammonium chloride | 0.5 to 2 g |
| 07 | Yeast extract | 0.5 to 2 g |
| 08 | Malic acid | 2 to 6 g |
| 09 | Potassium hydroxide | 2 to 8 g |
| 10 | Micronutrient solution*[1] | 1 to 3 mL |
| 11 | Fe-EDTA | 0.02 to 0.08 g |
| 12 | CMC | 2 to 8 g |
| 13 | Sucrose | 20 to 40 Kg |
| 14 | Gelatin | 0.5 to 2 g |
| 15 | Tryptophan | 0.1 to 0.5 g |

TABLE 2

Micronutrient stock solution and amount required for 1 L of final micronutrient solution

| | Reagents | 1 L (stock solution) | 1 L (micronutrients) |
|---|---|---|---|
| 01 | Ammonium molybdate | 190 g | 84 mL |
| 02 | Manganese sulfate | 300 g | 84 mL |
| 03 | Boric acid | 93.6 g | 648 mL |
| 04 | Copper sulphate | 10 g | 84 mL |
| 05 | Zinc sulfate | 10 g | 84 mL |

Example 2—Fermentation in a Bioreactor

For growing in a 2,000 L fermenter, the culture medium containing the amino acid tryptophan is used, as shown in Table 1. *A. brasilense* growth parameters in 2,000 L fermenters are: a pressure from 0.5 to 1.2 $kgf/cm^3$, shaking ranging from 40 to 45 hz, at 22 to 38° C. and an air flow rate of 1.0 to 2.5 $Nm^3/h$ (=0.0085 to 0.021 vvm) for 18 to 96 h.

Example 3—Stabilization

After the 18 to 96 h fermentation, the process of stabilizing the metabolites is carried out by sterilizing the microorganism-containing culture medium for approximately 15 to 120 minutes, at 100 to 130° C. and a pressure of from 0.5 to 2.0 $kgf/cm^2$.

Example 4—Photostability

For validating the formulation that guarantees photostability of the indoleacetic acid phytohormone, two procedures were carried out. In the first assay, the following was compared: i) synthetic IAA with water (with no protection from melanoidins); ii) synthetic IAA with the same culture medium used in the biological IAA production process of the present invention and iii) biological IAA; all samples being subjected to the sterilization process at 121° C. for approximately 1 hour, as claimed for the stabilization of indole compounds due to the production of melanoidins via Maillard reaction. After the period of time required for stabilization, IAA concentrations were assessed using Salkwolski reagent according to the methodology proposed by Glickmann and Dessaux (1994).

The results shown in Graph 1 demonstrate that synthetic IAA without the claimed stabilization process is fully degraded after 4 hours of exposure to UV light. Within the first hour of exposure, photodegradation already reaches 74.5%. However, when assessing the IAA produced biologically by *Azospirillum brasilense* greater stability was found, since there was lower reduction in the concentration of this compared to IAA with no stabilization (diluted in water), particularly after 1, 2 and 4 hours of exposure to UV light with only 0.7%, 17.2% and 29.1% degradation, respectively. Similarly, when synthetic IAA is added to the formulation presented in the technical solution, followed by the stabilization step, the same behavior of photoprotection to UV light was achieved. It demonstrates the surprising ability of the pigments produced through the Maillard reaction, melanoidins, to protect the phytohormone indoleacetic acid of biological and synthetic origin from photodegradation. Leasure et al. (2013) reported the difficulty of using indoleacetic acid in plants due to its high photodegradation rate, evidencing the importance of the claimed practical solution for enabling the agricultural use of IAA on a commercial scale, which is a potent plant growth promoter of natural origin that is capable of contributing to a sustainable agribusiness.

In the second procedure (Graph 2), different times of the process for stabilizing the formulation with biological IAA were assessed, ranging from 15 minutes, 1 hour and 1 h 30 minutes, in order to assess the role of melanoidin concentration in photoprotection.

As in the first assay, IAA phytohormone stabilization was effective and increased stability of the compound towards UV light radiation. It is also noted that exposure of the indole compound to different times of stabilization causes photoprotection in a directly proportional ratio, that is, the longer the process time, the greater the stability achieved, in particular when biological IAA stabilization process time was of 1 h 30 minutes, providing high stability of the IAA synthesized by *Azospirillum brasilense*. The surprising effect of an increased IAA stability was confirmed by applying the Scott-Knott mean test ($p \leq 0.05$) with significant differences in all times of exposure to ultraviolet light tested in the present assay. It is important to point out that although 54.85% of photodegradation of biological IAA takes place when no stabilization process is carried out, partial protection of biological IAA is due to sterilization of the culture medium prior to growing the microorganisms.

The results obtained demonstrate the effectiveness of the pigments produced during the stabilization process, the melanoidins, presented by the technical solution in increasing stability of the IAA phytohormone subjected to light radiation. This solution provides several possibilities for application of the plant growth promoting compound and contributes to agricultural sustainability, which is essential for the socio-environmental balance, being positively affected by innovative and applicable solutions that provide improvements for important crops while being environmentally friendly.

The invention claimed is:

1. A process for the production of an agricultural composition comprising the steps of:

(a) fermenting a culture comprising one or more indoleacetic add (IAA)-producing bacterial strains in the presence of tryptophan in a culture medium for about 18 to about 96 hours, wherein the one or more IAA-producing bacterial strains comprise strains of *Azospirillum brasilense*; and (b) stabilizing the fermented culture under temperature and pressure conditions that promote the conversion of nitrogen sources and reducing sugars into melanoidin-type pigments via the Maillard reaction, wherein the stabilization is carried out for about 15 to about 120 minutes to obtain the agricultural composition that exhibits increased photostability relative to an IAA containing agricultural composition with no melanoidins.

2. The process for the production of an agricultural composition according to claim 1, wherein the one or more *A. brasilense* strains are selected from the group consisting of Ab-V5 and Ab-V6.

3. The process for the production of an agricultural composition, according to claim 1, wherein the Maillard reaction takes place in a fermenter environment.

4. The process for the production of an agricultural composition, according to claim 1, wherein the fermentation is batch or fed batch culture.

5. The process for the production of an agricultural composition, according to claim 1, wherein the stabilization is carried out at a temperature of about 100° C. to about 130° C.

6. The process for the production of an agricultural composition, according to claim 1, wherein the stabilization is carried out at a pressure of about 0.5 $Kgf/cm^2$ to 2.0 $Kgf/cm^2$.

7. The process for the production of an agricultural composition, according to claim 1, wherein the one or more *Azospirillum brasilense* strains are *A. brasilense* Ab-V5 strain and the *A. brasilense* Ab-V6 strain and wherein said strains are inoculated separately.

8. The process for the production of an agricultural composition, according to claim 7, wherein the *A. brasilense* Ab-V5 strain and the *A. brasilense* Ab-V6 strain are grown by incubation on an orbital shaker at about 80 rpm to about 150 rpm.

9. The process for the production of an agricultural composition, according to claim 8, wherein the *A. brasilense* Ab-V5 strain and the *A. brasilense* Ab-V6 strain are grown by incubation for about 18 hours to about 96 hours.

10. The process for the production of an agricultural composition, according to claim 9, wherein the *A. brasilense* Ab-V5 strain and the *A. brasilense* Ab-V6 strain are grown separately in stainless steel round flasks each containing about 10 L of culture medium.

11. The process for the production of an agricultural composition, according to claim 10, wherein the *A. brasilense* Ab-V5 strain and the *A. brasilense* Ab-V6 strain are incubated for about 18 hours to about 96 hours.

12. The process for the production of an agricultural composition, according to claim 11, wherein the *A. brasilense* Ab-V5 strain and the *A. brasilense* Ab-V6 strain are incubated at an air flow rate of about 0.25 $Nm^3/h$ to about 1.0 $Nm^3/h$.

13. The process for the production of an agricultural composition, according to claim 10, wherein after separately growing the *A. brasilense* Ab-V5 strain and the *A. brasilense* Ab-V6 strain in two stainless steel round flasks, said two flasks are inoculated into two tanks each containing about 180 L of culture medium.

14. The process for the production of an agricultural composition, according to claim 13, wherein the *A. brasilense* Ab-V5 strain and the *A. brasilense* Ab-V6 strain are incubated for about 18 hours to about 96 hours.

15. The process for the production of an agricultural composition, according to claim 13, wherein the *A. brasilense* Ab-V5 strain and the *A. brasilense* Ab-V6 strain are incubated at an air flow rate of about 1.25 $Nm^3/h$ to about 3.0 $Nm^3/h$.

16. The process for the production of an agricultural composition, according to claim 8, wherein the incubation temperature is from about 22° C. to about 38° C.

17. The process for the production of an agricultural composition, according to claim 1, wherein the fermentation step is carried out at a pressure from about 0.5 $kgf/cm^3$ to about 1.2 $kgf/cm^3$.

18. The process for the production of an agricultural composition, according to claim 1, wherein the fermentation step is carried out with stirring of about 40 hz to about 45 hz.

19. The process for the production of an agricultural composition, according to claim 1, wherein the fermentation step is carried out at a temperature from about 22° C. to about 38° C.

20. The process for the production of an agricultural composition, according to claim 1, wherein the fermentation step is carried out at an air flow rate of about 1.0 $Nm^3/h$ to about 2.5 $Nm^3/h$.

* * * * *